Oct. 11, 1927.
F. L. WARD
1,644,699
HYDRAULIC CONVEYER
Filed July 14, 1924
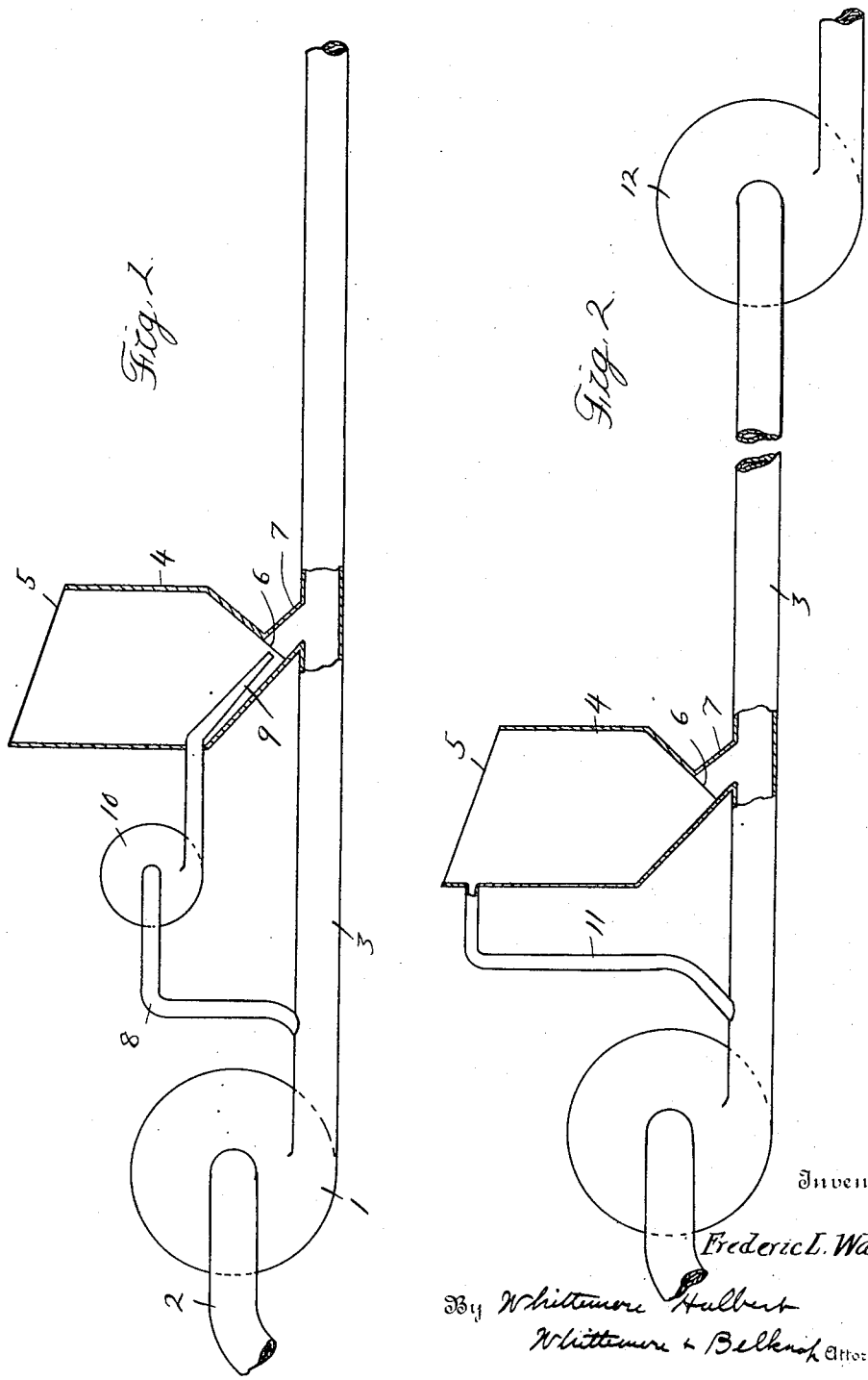
Inventor
Frederic L. Ward
By Whittemore Hulbert
Whittemore & Belknap Attorneys Patented Oct. 11, 1927.

1,644,699

UNITED STATES PATENT OFFICE.

FREDERIC L. WARD, OF DETROIT, MICHIGAN.

HYDRAULIC CONVEYER.

Application filed July 14, 1924. Serial No. 725,960.

The invention relates to hydraulic conveyer system for sand, gravel and the like and has for its object the arrangement of apparatus in a simple manner capable of transporting the solid materials for considerable distances without danger of dropping the same out of suspension.

According to the present state of the art, it has been proposed to feed material through a hopper into a pipe line containing flowing liquid so as to transport the material in suspension for relatively short distances, but when it is desired to increase the length of the delivery conduit, there are many problems which have not hitherto been satisfactorily solved, with as simple arrangement of apparatus as is herein described. In my copending application Serial Number 703,444, filed April 1, 1924, patented Feb. 22, 1927, No. 1,618,395, I have shown an arrangement where a force pump is connected to an unobstructed delivery conduit to which is connected a series of hoppers, each being provided with a cover and a shut-off valve and the arrangement is such that while one hopper is being filled with material, another hopper has the cover closed and is delivering the sand and gravel through the open valve into the conveying conduit. In my present application, I have provided an arrangement necessitating the use of only one feeding hopper which may be continuously maintained partially filled by any suitable means while at the same time, it is continuously introducing the material into the delivery conduit. If it is desired to transport the materials for a considerable distance it is necessary to increase the capacity of the pumping means but if the main pump were thus increased in size, it would result in a back pressure upon the hopper sufficient to prevent the continuous feed of the material by gravity unless a hopper of unusually large size were employed or some other means provided for insuring a positive feed. According to my new arrangement, however, I have overcome this difficulty by providing a second, or booster pump in the system adapted to prevent the back pressure reaching a value which interferes with the proper feeding of the material and I have illustrated the arrangement in two modified forms, the first, employing the booster pump in an auxiliary pipe line communicating with an injector at the mouth of the hopper and the second employing the booster in the main delivery conduit on the delivery side of the hopper.

In the drawings:

Figure 1 is a diagrammatic illustration of the preferred arrangement of apparatus;

Figure 2 is a similar illustration of the modified arrangement.

The main pump 1 has the inlet end thereof connected to the suction conduit 2 leading to the source of liquid while the outlet end is connected to the main delivery conduit 3. 4 is a hopper open at the top end 5 for receiving the sand and gravel from a bucket or other suitable delivery means and provided with the outlet opening 6 communicating with a passage-way 7 leading to the main conduit 3 and preferably inclined in the direction of flow through the latter. The conduit 3 is preferably unobstructed through its length so that a uniform flow of liquid will be obtained therethrough in order that the solid material will be carried in suspension with a minimum power out-put of the centrifugal pump 1.

In order to insure that the back pressure in the conduit does not interfere with the feeding of the material through the passageway 7 into the main conduit, I have provided an auxiliary conduit 8 preferably communicating with the main conduit 3 at a point on the delivery side of the main pump, this auxiliary conduit passing through the outer wall of the hopper 4 and connecting with a nozzle or injector 9, located at the outlet 6 of the hopper so as to throw a stream of water through the passage-way 7. A rotary pump 10 is placed in the auxiliary conduit 8, this pump being preferably capable of delivering a higher pressure and a smaller volume of liquid than the main pump 1. With this arrangement, the sand and gravel is continuously fed into the hopper 4 and maintained above a certain level therein and the weight of the material together with the injector action of the auxiliary conduit will insure a steady feed of material to the main conduit at all times.

While I do not wish to be limited to any exact size of the parts composing the system, I may state by way of example, that in the use of a pump from 8 to 15 inches in size and a main conduit of 12 to 15 inches in diameter and maintaining a pressure of 100 pounds, it is desirable to use a 6 to 8 inch auxiliary pump 10 capable of developing about 200 pounds pressure when connected to a 4 to 8 inch auxiliary pipe line 8.

In the modified form of apparatus as shown in Figure 2, the main pump and delivery conduit are similar to that previously described, but in this case the auxiliary pipe line 11 has no other pump connected therewith and is led to the top of the hopper 4 in order to aid in washing down the solid material towards the outlet passage-way 7. In this construction there is provided an auxiliary, or booster pump 12 in the main delivery conduit 3, through which the liquid and the suspended solid material passes and receives additional pressure for forcing the same through the remainder of the delivery conduit. This booster pump prevents back pressure from building up in the discharge opening 6 of the hopper and so insures a steady feed of material to the main delivery conduit, but the apparatus may be used for conveying material for considerable distances because the booster pump maintains a sufficient flow of liquid through the conduit to prevent the solid matter from falling out of suspension.

In both of the systems as described, the liquid is forced through the delivery conduit at a constant rate and as long as sand and gravel is fed into the hopper it should be conveyed through the pipe line with a minimum amount of manual labor, it being necessary only to feed the material to the hopper in order to have it constantly delivered to the delivery conduit.

What I claim as my invention is:—

1. A hydraulic conveying system for sand and gravel and the like, comprising a fluid pump, an unobstructed main delivery conduit extending therefrom, an open hopper feeding into said conduit, a connecting conduit between said hopper and said main conduit, a second pump having the inlet side thereof connected to said main delivery and a delivery conduit leading therefrom into said hopper adjacent the entrance to said connecting conduit.

2. A hydraulic conveyance system comprising a fluid pump, a delivery conduit extending therefrom, an open hopper provided with a discharge conduit connected to said main delivery conduit and means for forcing water through said discharge conduit at a higher pressure than through said delivery conduit between said main pump and hopper.

3. A hydraulic conveyance system comprising a main fluid pump and a main delivery conduit extending therefrom to the point of delivery of the material, an open hopper connected to said conduit, an auxiliary pipe line of smaller capacity than said main conduit having one end extending into said hopper and the other end connected to said main conduit, and a second pump in said auxiliary pipe line adapted to increase the pressure of the liquid delivered to said hopper above the pressure in said main delivery conduit between said main pump and hopper.

4. A hydraulic conveyance system for sand and gravel and the like, comprising a centrifugal pump, an unobstructed delivery conduit extending therefrom to the point of delivery of the material, an open hopper connected to said main delivery conduit, an auxiliary pipe line of smaller capacity than said main conduit having one end connected to said main conduit between said pump and said hopper and having the opposite end extending into said hopper, and a second pump in said auxiliary pipe line adapted to increase the pressure of the liquid delivered to said hopper above the pressure in said main delivery conduit between said main pump and hopper.

5. A hydraulic conveyance system for sand and gravel and the like, comprising a main fluid pump, a delivery conduit extending therefrom, an open hopper connected to said conduit, an injector within said hopper located adjacent to the discharge end thereof, and means for pumping the liquid into said injector at a higher pressure than the pressure between said main pump and said hopper.

6. A hydraulic conveying system for sand and gravel and the like comprising a centrifugal pump, an unobstructed delivery conduit extending therefrom, an open ended hopper having a discharge port, a conduit connecting said discharge port with said main delivery conduit and inclined in the direction of flow through the latter, an injector within said hopper having the discharge end thereof adjacent the discharge end of said hopper, a second centrifugal pump connected to said injector, and an auxiliary conduit of smaller capacity than said main conduit extending from the latter to said auxiliary pump.

7. A hydraulic conveying system for conveying sand and gravel and the like, comprising a delivery conduit, an open hopper feeding thereinto, a main fluid pump for forcing liquid through said conduit with insufficient pressure to allow escape of the liquid through said hopper, an auxiliary conduit having one end thereof communicating with said delivery conduit at a point adjacent the delivery side of the main pump and the other end extending into said hopper, and means for pumping the liquid flowing through said auxiliary conduit into said hopper at a higher pressure than the pressure between said main pump and hopper.

In testimony whereof I affix my signature.

FREDERIC L. WARD.